C. E. BURNETT.
SCALE ATTACHMENT FOR SUPPORTING WAGON BEDS.
APPLICATION FILED MAY 1, 1911.
1,017,244.
Patented Feb. 13, 1912.
2 SHEETS—SHEET 1.
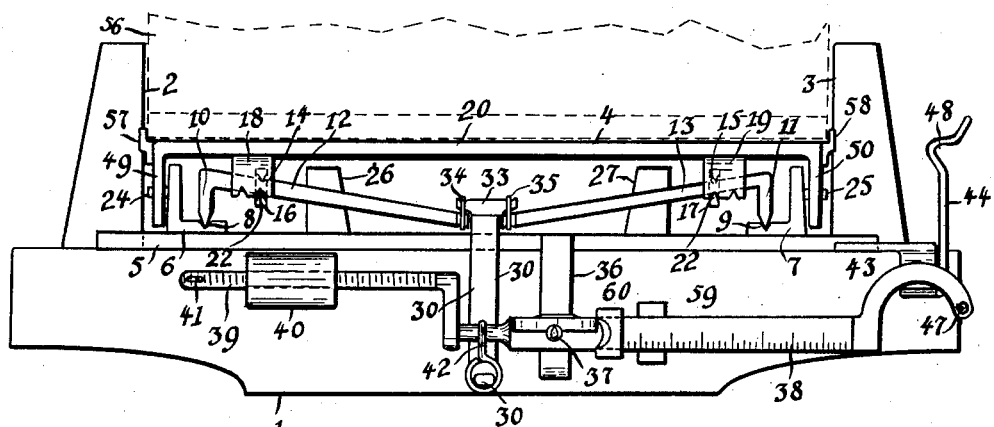
Fig. 1.
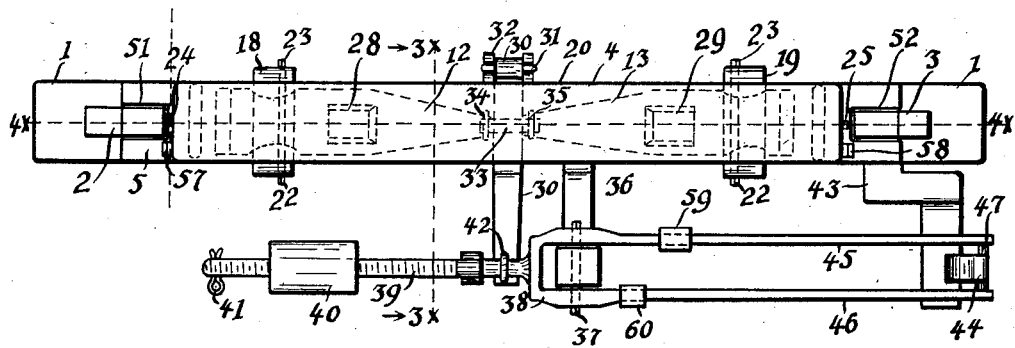
Fig. 2.
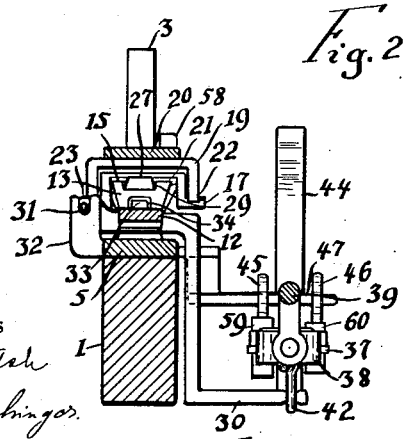
Fig. 3.
Fig. 8.
Fig. 7.
WITNESSES
INVENTOR
Charles E. Burnett
BY
Frank Keifer
ATTORNEY C. E. BURNETT.
SCALE ATTACHMENT FOR SUPPORTING WAGON BEDS.
APPLICATION FILED MAY 1, 1911.
1,017,244.
Patented Feb. 13, 1912.
2 SHEETS—SHEET 2.
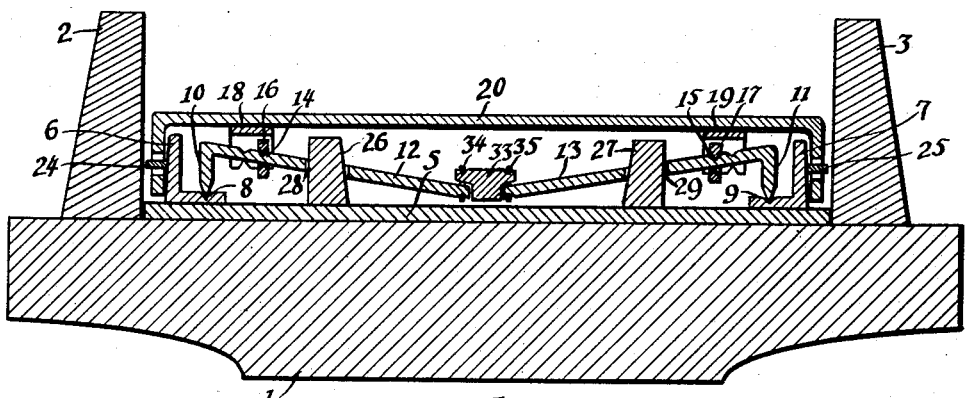
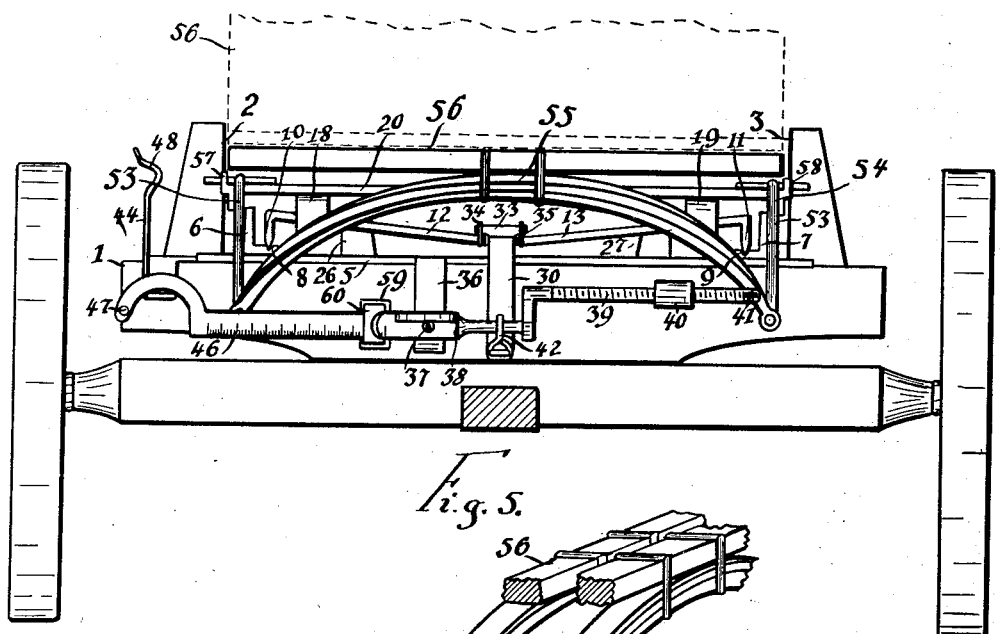
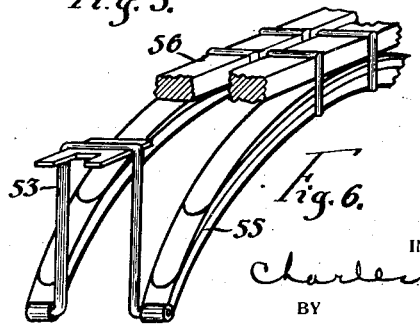
WITNESSES
INVENTOR
Charles E. Burnett
BY
Frank Keefer
ATTORNEY
COLUMBIA PLANOGRAPH CO., WASHINGTON, D. C.

UNITED STATES PATENT OFFICE.

CHARLES E. BURNETT, OF NORTH ROSE, NEW YORK, ASSIGNOR OF ONE-HALF TO CASSIUS M. CLAPP, OF NORTH ROSE, NEW YORK.

SCALE ATTACHMENT FOR SUPPORTING WAGON-BEDS.

1,017,244.  Specification of Letters Patent.  Patented Feb. 13, 1912.

Application filed May 1, 1911. Serial No. 624,508.

*To all whom it may concern:*

Be it known that I, CHARLES E. BURNETT, a citizen of the United States, residing at North Rose, in the county of Wayne and State of New York, have invented certain new and useful Improvements in Scale Attachments for Supporting Wagon-Beds, of which the following is a specification.

The object of my invention is to provide a scale mechanism for an ordinary wagon which can be easily thrown into and out of operation at will, whereby the weight of the load on the wagon may be readily ascertained.

Another object of my invention is to construct the scale mechanism in such manner that it may be readily fitted to the bolsters of an ordinary wagon, and interposed between them and the wagon bed.

Another object of my invention is to construct the scale mechanism so that springs may be interposed between them and the wagon bed.

These and other objects of my invention will be fully described in the specification and pointed out in the claims at the end thereof.

In the accompanying drawings, Figure 1 is a side elevation of a wagon bolster provided with my improved scale mechanism. Fig. 2 is a top plan view of the parts shown in Fig. 1. Fig. 3 is a vertical section on the line $3^x$—$3^x$ of Fig. 2. Fig. 4 is a longitudinal section on the line $4^x$—$4^x$ of Fig. 2. Fig. 5 is a side elevation of the scale in place on the wagon bolster and provided with springs interposed therebetween and the wagon bed. Fig. 6 is a perspective view of the hanger and springs shown in Fig. 5. Fig. 7 is a side elevation of one of the down turned ends of the top plate showing the pin and recess by which it is held in place. Fig. 8 is a perspective view of one of the uprights and its scale lever.

In the accompanying drawings, like reference numerals refer to like parts.

The wagon bolster 1 is provided with the upright stakes 2, 3 mounted thereon. On top of the bolster and engaging with said stakes, I provide the scale mechanism 4. This scale mechanism comprises a bed plate 5 having angles 6 and 7 mounted thereon, which angles are cut out with V-shaped notches at 8 and 9 to receive the knife edges 10 and 11 of the scale levers 12 and 13. These levers are recessed at 14 and 15 to receive the knife edges 16 and 17 which are interposed between said levers and the U-shaped bearing plates 18 and 19, which plates are fastened to the top bearing plate 20 of the scale mechanism. The knife edge 17 is illustrated in side elevation in Fig. 3 and it will be seen that it is shaped like a hanger having a knife edge in the central part 21 thereof which engages with the recess 15 on the scale lever 13, this knife edge projecting downwardly, and on its outer end it is provided with the knife edges 22 and 23 projecting upwardly, by which it is engaged by the bearing plate 19. It will be understood that the corresponding parts at the left of Fig. 1 are the same as those just described at the right of Fig. 1.

The angles 6 and 7 are provided with pins 24 and 25 which engage with suitable openings in the down turned ends of the top plate 20, by which the plate 20 is held securely in position, having a limited vertical movement on said pins. These openings are preferably a V shape inverted at the top and half round at the bottom. The pins 24 and 25 have a knife edge formed on the top thereof which engages with said inverted V-shaped openings to center the top plate 4 thereon when in its lowest position and free it from frictional engagement with said pins when it rises. See Fig. 7.

Erected on the bed plate 5 are the uprights or standards 26 and 27 which pass through suitable perforations 28 and 29 in the levers 12 and 13. These uprights are slightly tapered on three sides, the side toward the wagon stake being left perpendicular, and the perforations in the levers 12 and 13 are of such size and shape as to just clear these uprights when the scale is in balance and to make a snug fit therewith when the scale beam is raised to its uppermost position, as hereinafter described. These uprights accordingly center the levers on their bearings and hold them against accidental displacement therefrom. Connected to the ends of the scale levers 12 and 13 is the lever 30 which lever carries a knife edge 31 by which it is fulcrumed on the bearing 32 carried on the bed plate 5 for that purpose. The lever 30 is provided with a cross piece or yoke 33, from the ends of which are suspended the ends of the levers 12 and 13 by means of the links 34 and 35, these links being provided at the bearings with the levers and with the cross pieces with suitable knife edges, the levers and the cross pieces being suitably recessed to a V-shape to form bearings therewith.

On the bed plate 5 is carried a bracket 36 on which is carried a knife edge 37, on which in turn is mounted the scale beam 38. This scale beam at its rear end is provided with a threaded arm 39, along which is fitted to travel the counterpoise weight 40, by the adjustment of which the balance may be adjusted. The arm 39 is provided with a pin 41 which serves to keep the counterpoise weight from escaping therefrom. From the scale beam 38 is suspended a link 42 which engages with the end of the lever 30 and by which the train of mechanism between the scale beam 38 and the bearing plate or platform 20 is completed.

At the end of the bed plate 5 is provided a bracket 43 having a suitable upright 44 thereon which upright is engaged between the arms 45 and 46 of the scale beam 38. These arms at their front end carry a cross brace 47 which when the beam is pushed to its uppermost position engages with the recess 48 at the top of the upright 44, by which it is held in its elevated position. While in this position the scale mechanism is thrown out of operation and the load is taken off of the knife edges of the scale mechanism by the construction which I am now about to describe.

The top plate 20 has its ends down turned as indicated at 49 and 50, these down turned ends being of sufficient length to engage with and rest on the bed plate 5 just before the scale beam 38 reaches its uppermost position, so that when the scale beam 38 is in its elevated position the knife edges are not in close engagement with their sockets or bearings. While the parts are in this position the top plate 20 also rests when under heavy load upon the uprights 26 and 27 which are made sufficiently long for this purpose. Normally a slight clearance may be allowed between them so that no contact will be made when the scale is at rest and the parts are under light load, but when the load has been increased and there is any tendency for the top plate to spring or sag thereunder, the uprights will support the top plate 20 at the intermediate points.

The upright members of the angles 6 and 7 are slightly tapered so as to engage with the down turned ends 49 and 50 when the top plate is lowered, preventing endwise movement of the top plate and centering it on its bearings. When the top plate is raised again the ends are drawn free from the angles so as to avoid frictional contact therewith.

The outer ends of the bed plate 5 are recessed at 51 and 52 so as to engage with the upright stakes 2 and 3, by which the scale mechanism as a whole is held securely in place on the bolster. As all the parts are securely tied to the bed plate, it is apparent that the scale mechanism may be lifted bodily off of the bolster if it is found desirable to remove it from the wagon.

The wagon bed may if desired be rested directly on the top plate 20 or springs may be interposed between the wagon bed and said top plate 20. In Fig. 5 I have shown the construction by which said springs may be mounted on said top plate. Suspended from the top plate are the U-shaped hangers 53 and 54, to the bottom of which on each side of the bolster are attached the supporting springs, one of which, 55, is illustrated in Fig. 5. On top of these rests the wagon bed 56, which bed may be attached or fastened to said springs in any suitable manner.

The stakes 2 and 3 are of sufficient length in ordinary wagon construction to hold the wagon bed safely against side movement when my improved scale mechanism and supporting springs are placed between the wagon bed and bolster, the scale mechanism being made compact to secure this result.

Mounted on the down turned ends of the top plate are the lugs 57 and 58 which engage with the sides of the wagon bed and hold it centrally in position and out of contact with the stakes 2 and 3, preventing any frictional engagement between said stakes and the wagon bed that might interfere with the accuracy of the balance.

It will be understood of course that there are two bolsters in an ordinary wagon and that one of these scale mechanisms will be provided on each of said bolsters, and these scale mechanisms will be used each independently of the other and a separate reading of each of them will be taken and added together in order to ascertain the correct weight of the wagon bed and its contents.

The scale beam 38 is provided with the two arms 45 and 46 each of which is provided with a separate sliding weight 59 and 60 mounted to slide thereon, by which the balance can be secured in the ordinary well known manner. If desired a pendant may be suspended from the outer end of the scale beam, on which standard weights can be used in the same manner as they are ordinarily used in connection with platform scales.

It will be understood of course that the bolsters are supported on the axles of the wagon and that the wheels and running gear, etc., of the wagon are of any ordinary or preferred type, the details of which need not necessarily be illustrated in this connection.

Having thus described my invention, what I claim as new and patentable is as follows:

1. The combination in a scale attachment for a wagon bed of a base plate having recessed ends and a top plate therefor, scale levers mounted on knife edges interposed between said plates and extending parallel thereto, a lever mounted on said base plate and extending transversely thereto, said scale levers having the free ends thereof attached to said transverse lever, a bracket depending from said base plate, a scale beam pivotally mounted on said bracket, weights mounted to slide on said scale beam on one side of said pivot, connections between said scale beam and said transverse lever on the other side of said pivot.

2. The combination in a scale attachment for a wagon of a base plate, angles attached thereto near the ends thereof, a top plate extending parallel to said base plate and having down turned ends thereon, pin and slot connections between said angles and the down turned ends of said top plate, by which a limited vertical movement is permitted to said top plate, scale levers and knife edges interposed between said top plate and said base plate.

3. The combination in a scale attachment for a wagon of a base plate, angles attached thereto near the ends thereof, a top plate extending parallel to said base plate and having down turned ends thereon, pin and slot connections between said angles and the down turned ends of said top plate, by which a limited vertical movement is permitted to said top plate, scale levers and knife edges interposed between said top plate and said base plate, said scale levers being fulcrumed in said angles and extending toward the center of said base plate and parallel thereto.

4. The combination in a scale attachment for a wagon of a base plate, angles attached thereto near the ends thereof, a top plate extending parallel to said base plate and having down turned ends thereon, pin and slot connections between said angles and the down turned ends of said top plate, by which a limited vertical movement is permitted to said top plate, scale levers and knife edges interposed between said top plate and said base plate, said scale levers being fulcrumed in said angles and extending toward the center of said base plate and parallel thereto, a transverse lever pivoted on said base plate, connections between the free ends of said scale levers and said transverse lever whereby the movement of the top plate is communicated to said transverse lever.

5. The combination in a scale attachment for a wagon of a base plate, angles attached thereto near the ends thereof, a top plate extending parallel to said base plate and having down turned ends thereon, pin and slot connections between said angles and the down turned ends of said top plate, by which a limited vertical movement is permitted to said top plate, scale levers and knife edges interposed between said top plate and said base plate, said scale levers being fulcrumed in said angles and extending toward the center of said base plate and parallel thereto, a transverse lever pivoted on said base plate, connections between the free ends of said scale levers and said transverse lever whereby the movement of the top plate is communicated to said transverse lever, means for balancing said transverse lever against said top plate and indicating the weight resting thereon.

6. The combination in a wagon of a bolster, stakes mounted on said bolster near the opposite ends thereof, a scale mechanism mounted on said bolster between said stakes, said scale mechanism comprising a base plate having the ends thereof forked or recessed to engage with said stakes, said scale mechanism also comprising a top plate to receive the weight of the bed of the wagon thereon, a hanger suspended from each end of said top plate, springs mounted on said hangers and rising above said top plate, a cross bar attached to said springs.

7. The combination in a wagon of a bolster, stakes mounted on said bolster near the opposite ends thereof, a scale mechanism mounted on said bolster between said stakes, said scale mechanism comprising a base plate having the ends thereof forked or recessed to engage with said stakes, said scale mechanism also comprising a top plate to receive the weight of the bed of the wagon thereon, lugs on the ends of said top plate and projecting upwardly therefrom to hold the wagon bed supported on said top plate between the stakes and out of contact with the stakes.

8. The combination in a scale mechanism for supporting a wagon bed of a base plate, scale levers mounted thereon, a scale beam suspended from said base plate and operatively connected with said scale levers, a bracket on the end of said base plate projecting outwardly under said scale beam and limiting its downward travel, and an upright supported on said bracket and having a recess therein with which said scale beam engages when raised to its highest position.

9. The combination in a scale mechanism for supporting a wagon bed of a base plate, scale levers mounted thereon having slots therein, uprights mounted on said base plate and extending through said slots in said scale levers, said uprights being tapered so that said scale levers will engage therewith when in one position and be free therefrom when in another position.

10. The combination in a scale mechanism for supporting a wagon bed of a base plate, scale levers mounted thereon having slots therein, uprights mounted on said base plate and extending through said slots in said scale levers, a top plate supported by said scale levers and capable of making contact with said uprights when under heavy load to be supported thereby.

11. The combination in a scale mechanism for supporting a wagon bed of a base plate, scale levers mounted thereon, a top plate supported by said scale levers, said top plate having down turned ends, angles mounted on said base plate, pins on said angles, slots in said down turned ends with which said pins engage, said pins and said slots being shaped to center the top plate on said bottom plate when in its lowest position, said slots clearing said pins when the top plate is elevated.

In testimony whereof I affix my signature in presence of two witnesses.

CHARLES E. BURNETT.

Witnesses:
LENA M. ASH,
ALICE M. JOHANNS.

Copies of this patent may be obtained for five cents each, by addressing the "Commissioner of Patents, Washington, D. C."